US007722234B2

(12) United States Patent
Matsumoto

(10) Patent No.: US 7,722,234 B2
(45) Date of Patent: May 25, 2010

(54) VEHICLE HEADLIGHT

(75) Inventor: Kazuhiro Matsumoto, Isehara (JP)

(73) Assignee: Ichikoh Industries, Ltd., Tokyo (JP)

(*) Notice: Subject to any disclaimer, the term of this patent is extended or adjusted under 35 U.S.C. 154(b) by 10 days.

(21) Appl. No.: 11/944,978

(22) Filed: Nov. 26, 2007

(65) Prior Publication Data

US 2008/0123360 A1 May 29, 2008

(30) Foreign Application Priority Data

Nov. 27, 2006 (JP) ............................ 2006-318649

(51) Int. Cl.
*B60Q 1/16* (2006.01)

(52) U.S. Cl. .................. 362/539; 362/296.08; 362/303; 362/507; 362/518

(58) Field of Classification Search ................. 362/539, 362/507, 538, 516, 517, 518, 303, 297, 296.05, 362/296.07, 296.08
See application file for complete search history.

(56) References Cited

U.S. PATENT DOCUMENTS 6,102,557 A * 8/2000 Kaneda ...................... 362/507
6,550,944 B2 * 4/2003 Kusagaya .................... 362/466
6,758,589 B2 * 7/2004 Hayakawa et al. .......... 362/539
6,796,696 B2 * 9/2004 Taniuchi ..................... 362/539
6,817,744 B2 * 11/2004 Tatsukawa .................. 362/544
7,008,094 B2 * 3/2006 Taniuchi ..................... 362/539
7,290,909 B2 * 11/2007 Komatsu et al. ............ 362/538
7,316,493 B2 * 1/2008 Kinoshita ................... 362/539
7,370,996 B2 * 5/2008 Ohshio ....................... 362/539

FOREIGN PATENT DOCUMENTS

JP 05-87704 U 11/1993
JP 11-232903 A 8/1999
JP 2000-100226 A 4/2000
JP 2000-340014 A 12/2000
JP 2001-057103 A 2/2001
JP 2003-257221 A 9/2003

* cited by examiner

*Primary Examiner*—Sandra L O'Shea
*Assistant Examiner*—Leah S Lovell
(74) *Attorney, Agent, or Firm*—Foley & Lardner LLP

(57) ABSTRACT

A light shielding member shields a part of a light radiated from a light source and passes a remaining part of the light. A reflection surface reflects the light that passes through the light shielding member forward of a vehicle as a light distribution pattern including a cutoff line on a driving lane side and a cutoff line on an oncoming lane side.

5 Claims, 8 Drawing Sheets

VEHICLE HEADLIGHT

CROSS-REFERENCE TO RELATED APPLICATIONS

The present application claims priority to and incorporates by reference the entire contents of Japanese priority document 2006-318649 filed in Japan on Nov. 27, 2006.

BACKGROUND OF THE INVENTION

1. Field of the Invention

The present invention relates to a vehicle headlight.

2. Description of the Related Art

A conventional headlight for a vehicle currently in use radiates a light forward of a vehicle in a light distribution pattern including a cutoff line on a driving lane side that is on or near a horizontal line of a screen and a cutoff line on an oncoming lane side below the cutoff line on the driving lane side (hereinafter, simply "a light distribution pattern"). For example, a vehicle headlight disclosed in Japanese Patent Application Laid-open No. H11-232903 consists of a light source, a light shielding member, and a reflection surface that reflects a light emitted from a light emitter of the light source and reflects a light distribution pattern forward of a vehicle. When the light emitter emits light, a part of the light from the light emitter is shielded by the light shielding member, and a remaining part of the light from the light emitter, i.e., a part of the light that is not shielded by the light shielding member, is reflected by the reflection surface. Then, the light is radiated forward of the vehicle in the light distribution pattern.

However, because the vehicle headlight forms the cutoff line by the light shielding member, a light density is high near the cutoff line. Therefore, the vehicle headlight may cause a glare on the oncoming lane side, although the forward visibility is improved.

A vehicle headlight disclosed in Japanese Utility Model Application Laid-open No. H05-87704 is designed to reduce the light density near a cutoff line of a light distribution pattern. However, with the vehicle headlight disclosed in Japanese Utility Model Application Laid-open No. H05-87704, a problem arises in forward visibility on the driving lane side while an improvement can be obtained on the glare occurring on the oncoming lane side.

SUMMARY OF THE INVENTION

It is an object of the present invention to at least partially solve the problems in the conventional technology.

A vehicle headlight according to one aspect of the present invention irradiates a road ahead of a vehicle with a light distribution pattern including a first cutoff line substantially on a horizontal line of a screen on a driving lane side and a second cutoff line on an oncoming lane side. The vehicle headlight includes a light source that radiates a light; a light shielding member that shields a part of the light radiated from the light source and passes a remaining part of the light; and a reflection surface that reflects the light that passes the light shielding member ahead of the vehicle as the light distribution pattern. The reflection surface includes a first reflection surface that forms a first light distribution pattern mainly including the first cutoff line on the driving lane side, and a second reflection surface that forms a second light distribution pattern mainly including the second cutoff line on the oncoming lane side. Each of the first reflection surface and the second reflection surface has a width in an up-and-down direction with respect to a horizontal line that passes the light source. A shape of the light shielding member is projected substantially to the horizontal line that passes the light source in the first reflection surface to form the first cutoff line on the driving lane side. The light shielding member includes a first edge that increases a light density around the first cutoff line on the driving lane side in the first light distribution pattern.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Figure 1:
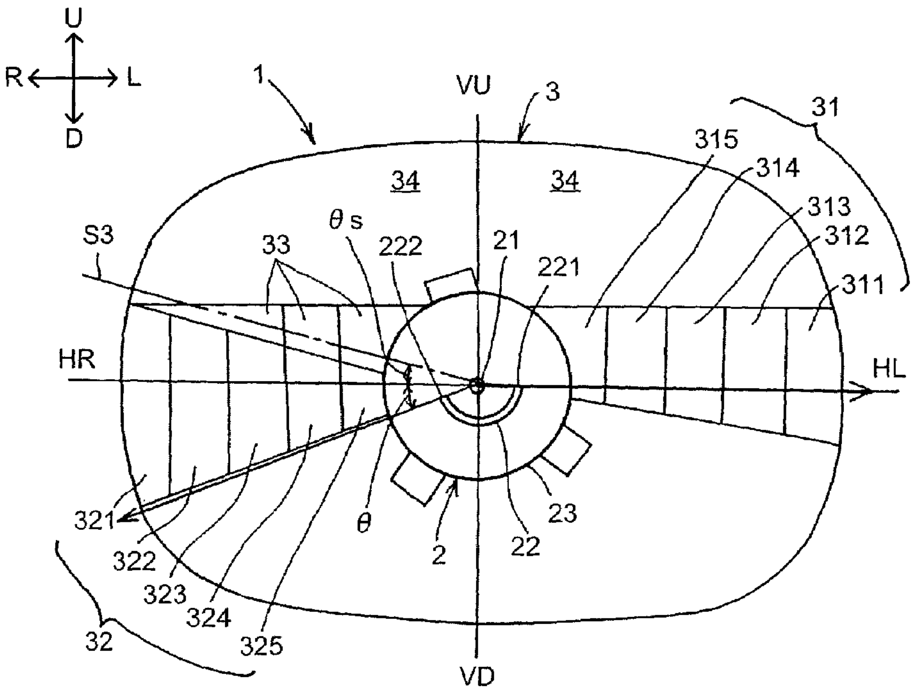
FIG. 1 is a front view of a light source and reflection surfaces of a reflector of a vehicle headlight according to a first embodiment of the present invention.

Exemplary embodiments of the present invention are explained in detail below with reference to the accompanying drawings. In the drawings, a symbol "F" indicates a forward direction of a vehicle (a forward-moving direction of the vehicle), a symbol "B" indicates a backward direction of the vehicle, a symbol "U" indicates an upward direction when seeing the forward direction from a driver side, a symbol "D" indicates a downward direction when seeing the forward direction from the driver side, a symbol "L" indicates a left direction when seeing the forward direction from a driver side, a symbol "R" indicates a right direction when seeing the forward direction from the driver side, a symbol "VU-VD" indicates a vertical line and an up-and-down vertical line on a screen S, a symbol "HL-HR" indicates a horizontal line and a right-to left horizontal line on the screen S, a symbol "Z-Z" indicates an optical axis of a reflection surface, a symbol "Z1-Z1" indicates a lamp axis of a halogen lamp as a light source, and a symbol "Z2-Z2" indicates a lamp axis of a discharge lamp as a light source.

A vehicle headlight 1 according to a first embodiment is explained referring to FIGS. 1 to 12. The vehicle headlight 1 is, for example, a vehicle headlamp, and is capable of forming a predetermined light distribution pattern (e.g., a light distribution pattern for a low-beam or a light distribution pattern for a high-beam). The vehicle headlight 1 is mounted on a vehicle that drives on the right side.

The vehicle headlight 1 is mounted on each of the right side (a right-side headlamp) and the left side (a left-side headlamp) on a front portion of the vehicle.

As shown in FIG. 1, the vehicle headlight 1 includes a light source 2, a shade (light shielding member) 22, and a reflector 3. The reflector 3 includes a first reflection surface 31, a second reflection surface 32, a third reflection surface 33, and a fourth reflection surface 34. The light source 2, the shade 22, and the reflector 3 are arranged in a lamp chamber (not shown) divided by a lamp housing (not shown) and a lamp lens (not shown).

Figure 9:
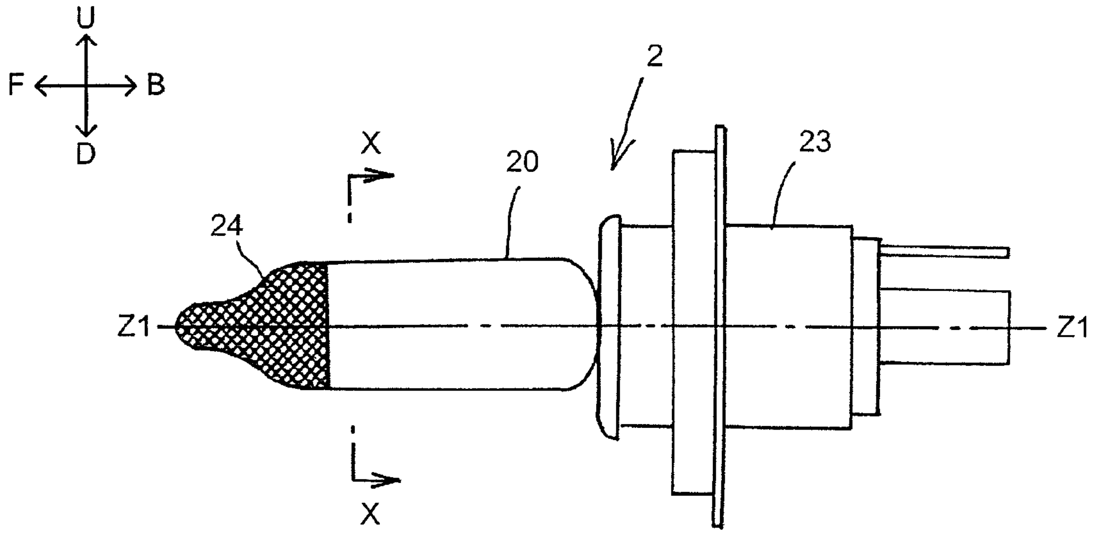
FIG. 9 is a side view of a halogen lamp as the light source.
Figure 10:
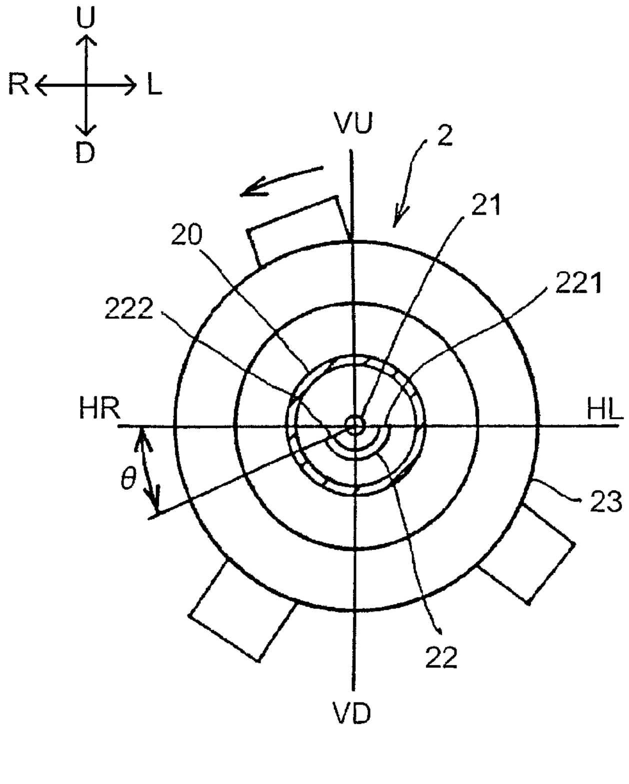
FIG. 10 is a cross section taken along line X-X in FIG. 9.

As shown in FIGS. 9 and 10, the light source 2 is an H4 halogen lamp or an HB2 halogen lamp in the present embodiment. The light source 2 includes a tube (a glass tube) 20, a small cylindrical filament (a light emitter) 21 and the shade 22 arranged in the tube 20, a base 23, and a light shielding film (a black top) 24. The light source 2 is a double-filament lamp; however, only one filament (a sub filament or a low beam filament) is shown in the drawings for the sake of explanation.

The shade 22 shields a part of the light emitted from the filament 21, and allows a remaining part of the light to pass to the tube 20 side. The shade 22 has a dish-like shape with a circular cross section to cover the lower side of the filament 21. The shade 22 includes a first edge 221 and a second edge 222. As shown in FIG. 10, a center angle of the shade 22 (a center angle in a range from the first edge 221 to the second edge 222 or in a range in which a light from the filament 21 is shielded) is calculated by $(180-\theta)°$. In the present embodiment, the angle $\theta$ is about 15°. As shown in FIGS. 1 and 10, the first edge 221 is positioned on the left side of the filament 21, and the second edge 222 is positioned on the right side of the filament 21.

The light source 2 is attached to the reflector 3 in a state in which the light source 2 is rotated in a direction indicated by an arrow (counterclockwise) in FIG. 10 with respect to the attachment position of a light source in a conventional vehicle headlamp. Specifically, as shown in FIGS. 1 and 10, the light source 2 is attached to the reflector 3 in a state in which the light source 2 is rotated in the direction indicated by the arrow around the lamp axis Z1-Z1 so that the first edge 221 is on or near a horizontal line HL-HR that passes the center of the filament 21. Therefore, the first edge 221 is projected to or near the horizontal line HL-HR that passes the light source 2 in the leftmost side first reflection surface 31 as shown in a solid line in FIG. 1.

As shown in FIGS. 1 and 10, the second edge 222 is at a position rotated counterclockwise by the angle $\theta$ with respect to the horizontal line HL-HR. Therefore, the second edge 222 is projected to a position rotated counterclockwise by the angle $\theta$ with respect to the horizontal line HL-HR in the rightmost side second reflection surface 32 as shown in the solid line in FIG. 1.

Figure 2:
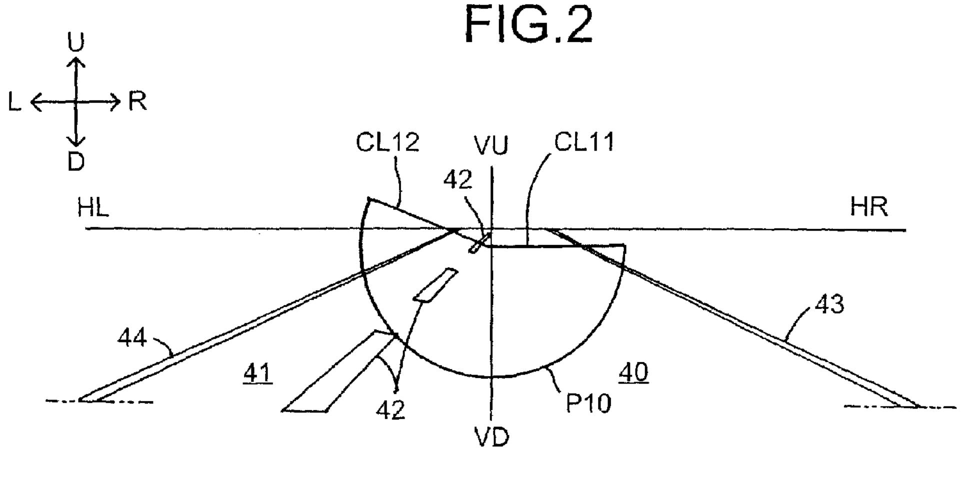
FIG. 2 is a schematic diagram for explaining a light distribution pattern that is obtained by reflecting a light from the light source by the reflection surfaces of a paraboloid of revolution and radiating the light on a screen.
Figure 3:
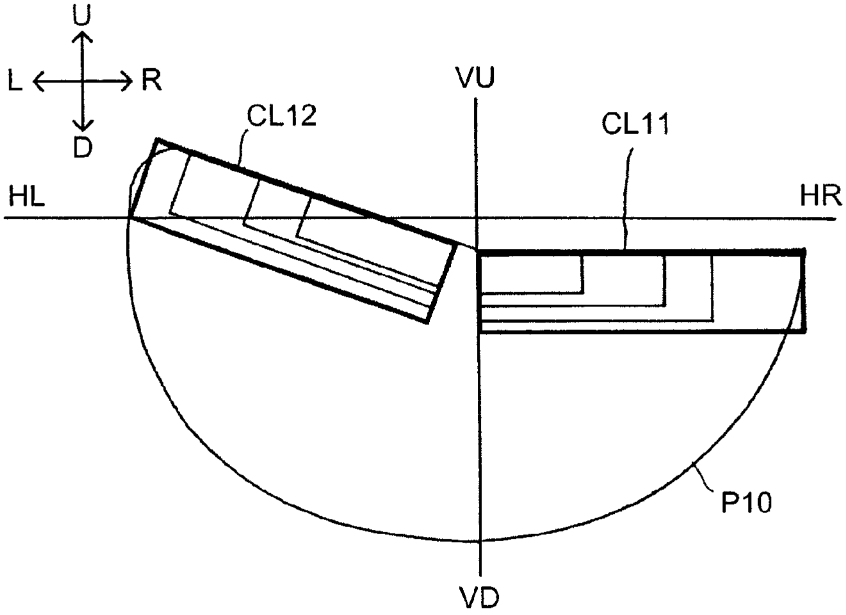
FIG. 3 is a schematic diagram for explaining the light distribution pattern and rectangular images of a filament of the light source.

FIGS. 2 and 3 are schematic diagrams for explaining a light distribution pattern P10 radiated on a screen. The light distribution pattern P10 is obtained by the following manner. That is, the light that is emitted from the filament 21 and passes the shade 22 (i.e., the light that is not shielded by the shade 22) is reflected by a reflection surface (not shown) of a paraboloid of revolution, and is radiated on the screen ahead, whereby the light distribution pattern P10 is formed. The filament 21 is positioned forward of a focal point of the reflection surface of a paraboloid of revolution. Therefore, the light radiated from the filament 21 is reflected by the reflection surface of a paraboloid of revolution, intersects at a point that is forward of the focal point of the reflection surface of a paraboloid of revolution, and is then diffused to be radiated on the screen as the light distribution pattern P10. Thus, a shape of the light distribution pattern P10 is a mirror image of the light image radiated from the filament 21 in a horizontal direction and a vertical direction.

Figure 6:
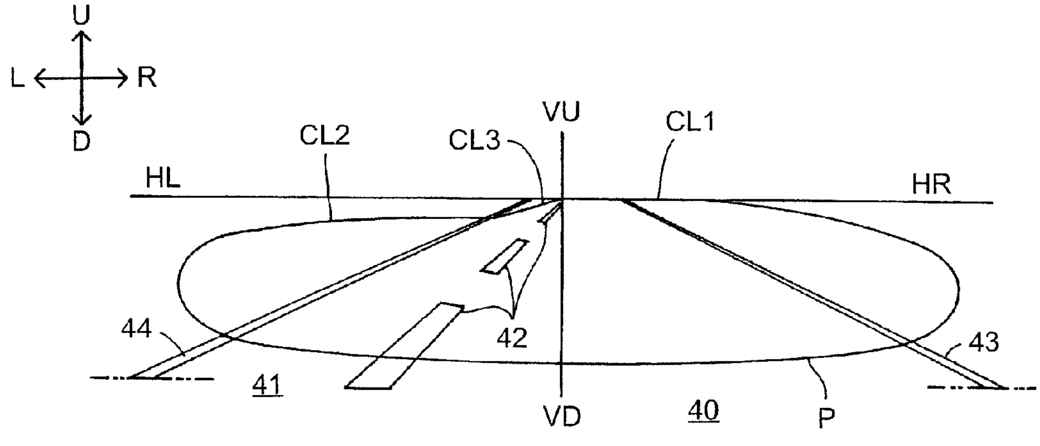
FIG. 6 is a schematic diagram of the predetermined light distribution pattern radiated on the screen.
Figure 7:
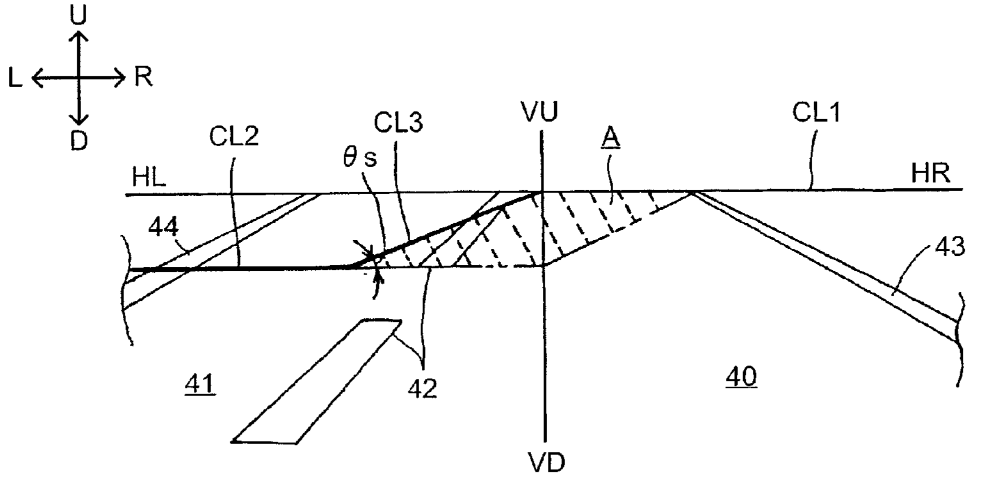
FIG. 7 is a schematic diagram for explaining the third light distribution pattern in detail.

Specifically, as shown in FIG. 2, the light distribution pattern P10 has a fan-like shape and includes a horizontal first cutoff line CL11 on a right driving lane 40 side and a diagonal second cutoff line CL12 on a left oncoming lane 41 side. The horizontal first cutoff line CL11 is formed by the first edge 221, and the diagonal second cutoff line CL12 is formed by the second edge 222. In FIGS. 2, 6, and 7, a center line 42, a shoulder 43 on the right driving lane 40 side, and a shoulder 44 on the left oncoming lane 41 side are shown.

As shown in FIG. 3, rectangular images of the filament 21 are arranged in a radial direction in the light distribution pattern P10. The long sides of the rectangular images are along the horizontal first cutoff line CL11 and the diagonal second cutoff line CL12.

As shown in FIGS. 4 to 8, the first to fourth reflection surfaces 31 to 34 reflect the light that is radiated from the filament 21 and passes the shade 22, i.e., the light that is not shielded by the shade 22, forward of the vehicle as a light distribution pattern P including a first cutoff line CL1 on the right driving lane 40 side, a second cutoff line CL2 on the left oncoming lane 41 side, and a slant third cutoff line CL3 in the middle. The first cutoff line CL1 is on or near the horizontal line HL-HR of the screen S. The second cutoff line CL2 is below the first cutoff line CL1. The slant third cutoff line CL3 is on or near the center line 42 between the first cutoff line CL1 and the second cutoff line CL2. The light distribution pattern P including the cutoff lines CL1 to CL3 is, for example, a light distribution pattern for a low-beam and a light distribution pattern for a high-beam.

Figure 8:
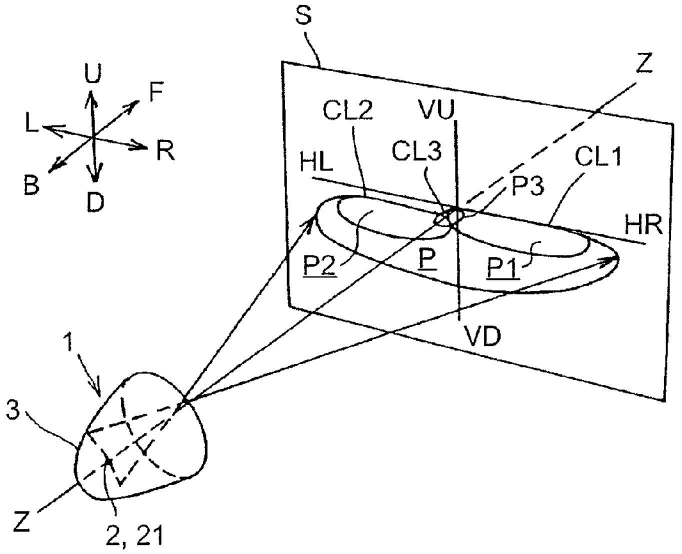
FIG. 8 is a schematic diagram for explaining a relation between the vehicle headlight and the screen.

The first to fourth reflection surfaces 31 to 34 are formed by performing an aluminum deposition, a silver painting, or the like. As shown in FIGS. 1 and 8, each of the first to fourth reflection surfaces 31 to 34 is a reflection surface such as a free curved surface (a non-uniform rational B-spline (NURBS) curved surface) based on a parabola (a paraboloid of revolution). The NURBS curved surface of each of the first to fourth reflection surfaces 31 to 34 is a free curved surface of the NURBS described in "Mathematical Elements for Computer Graphics" (Devid F. Rogers, J Alan Adams). A through hole (not shown) for attaching the light source 2 is formed in the center of the reflector 3.

The reflection surface of the reflector 3 includes the first to fourth reflection surfaces 31 to 34 as above.

As shown in FIG. 1, the first reflection surface 31 is positioned on the left side of the light source 2 in the reflector 3, and has a width in an up-and-down direction with respect to the horizontal line HL-HR. As shown in FIG. 1, the first reflection surface 31 includes vertically divided five segments 311, 312, 313, 314, and 315. The first reflection surface 31 forms a first light distribution pattern P1 mainly including the first cutoff line CL1. Specifically, the first reflection surface 31 raises the horizontal first cutoff line CL11 shown in FIG. 2 to the horizontal line HL-HR or to a position near the horizontal line HL-HR to form the first cutoff line CL1, and expands a light distribution pattern including the horizontal first cutoff line CL11 in the light distribution pattern P10 shown in FIG. 2 largely in a horizontal direction and a little in a vertical direction to form the first light distribution pattern P1 including the first cutoff line CL1.

Figure 4:
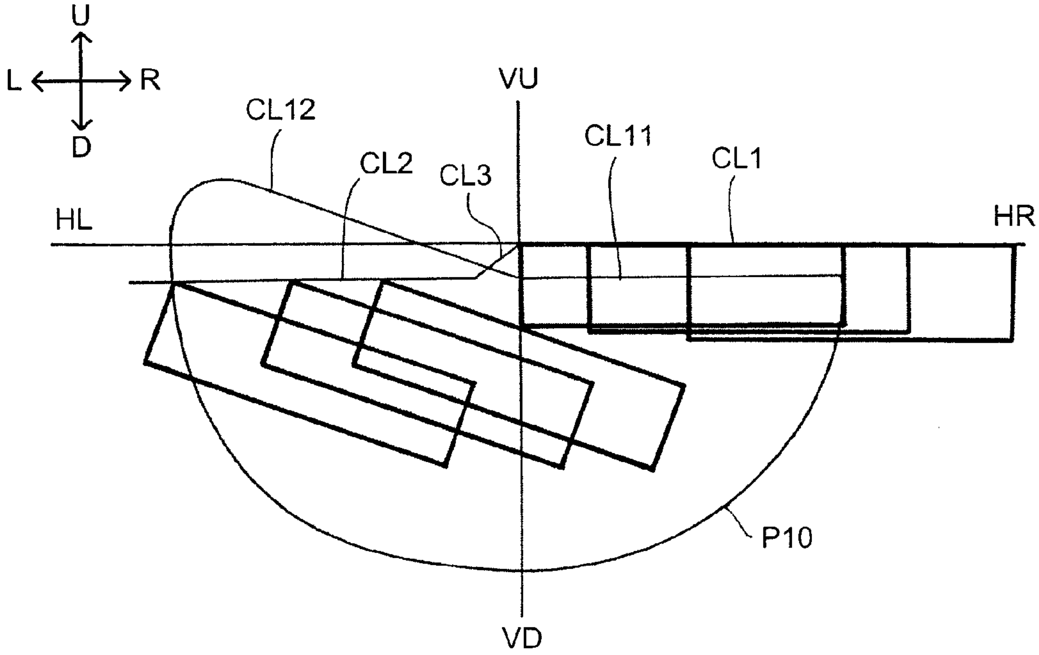
FIG. 4 is a schematic diagram for explaining a state in which the light distribution pattern and the rectangular images are changed to a predetermined light distribution pattern by a first reflection surface and a second reflection surface.

More specifically, as shown in FIG. 4, the first reflection surface 31 raises the rectangular images of the filament 21 whose long sides are along the horizontal first cutoff line CL11 shown in FIG. 2 to the horizontal line HL-HR or to a position near the horizontal line HL-HR without changing the direction of the rectangular images, and expands an area of the rectangular images largely in the horizontal direction and a little in the vertical direction. Because the long sides of the rectangular images expanded in such manner are along the first cutoff line CL1, a light density (brightness, illuminance, light quantity) near the first cutoff line CL1 is high. Consequently, with a simple design of the reflection surface, the first reflection surface 31 can form the first light distribution pattern P1 having a high light density near the first cutoff line CL1.

Light distribution patterns P11, P12, P13, P14, and P15 in the first light distribution pattern P1 are mainly formed by the segments 311, 312, 313, 314, and 315, respectively.

Figure 5:
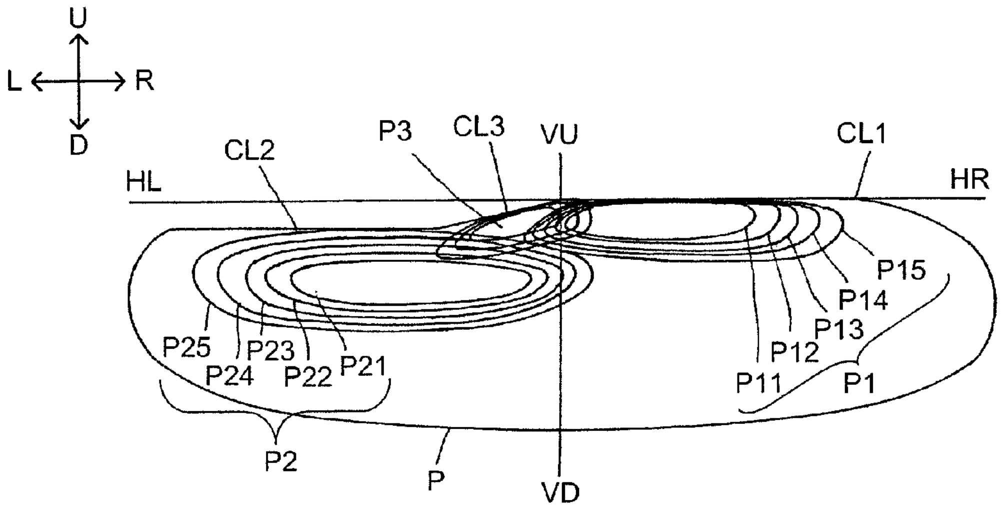
FIG. 5 is a schematic diagram for explaining the predetermined light distribution pattern representing a first light distribution pattern to a third light distribution pattern in detail.

As shown by the solid line in FIG. 1, the first edge 221 is projected to or near the horizontal line HL-HR in the first reflection surface 31, so that the first cutoff line CL1 is formed by the first edge 221. As shown in FIG. 5, because the first edge 221 cuts off the first light distribution pattern P1 at a portion having a high light density in the first light distribution pattern P1, the light density near the first cutoff line CL1 becomes high in the first light distribution pattern P1.

As shown in FIG. 1, the second reflection surface 32 is positioned on the right side of the light source 2 in the reflector 3, and has a width in the up-and-down direction with respect to the horizontal line HL-HR. The lower borderline of the second reflection surface 32 is on or near the line that is rotated counterclockwise by the angle θ around the light source 2 with respect to the horizontal line HL-HR. As shown in FIG. 1, the second reflection surface 32 includes vertically divided five segments 321, 322, 323, 324, and 325. The second reflection surface 32 forms a second light distribution pattern P2 mainly including the second cutoff line CL2. Specifically, the second reflection surface 32 makes the diagonal second cutoff line CL12 shown in FIG. 2 horizontal and lowers the diagonal second cutoff line CL12 below the first cutoff line CL1 to form the second cutoff line CL2, and expands a light distribution pattern including the diagonal second cutoff line CL12 in the light distribution pattern P10 shown in FIG. 2 largely in the horizontal direction and a little in the vertical direction to form the second light distribution pattern P2 including the second cutoff line CL2.

More specifically, as shown in FIG. 4, the second reflection surface 32 lowers the obliquely arranged rectangular images of the filament 21 whose long sides are along the diagonal second cutoff line CL12 shown in FIG. 2 below the first cutoff line CL1 without changing the direction of the rectangular images, and expands an area of the rectangular images largely in the horizontal direction and a little in the vertical direction. Because only the corners of the rectangular images are on the second cutoff line CL2, the light density near the second cutoff line CL2 is low. Consequently, with a simple design of the reflection surface, the second reflection surface 32 can form the second light distribution pattern P2 having a low light density near the second cutoff line CL2.

Light distribution patterns P21, P22, P23, P24, and P25 in the second light distribution pattern P2 are mainly formed by the segments 321, 322, 323, 324, and 325, respectively.

As shown by the solid line in FIG. 1, the second edge 222 is projected to or near the lower borderline of the second reflection surface 32 (a line that is rotated counterclockwise by the angle θ around the light source 2 with respect to the horizontal line HL-HR or in the vicinity of the line), so that the second cutoff line CL2 is formed by the second edge 222. As shown in FIG. 5, because the second edge 222 cuts off the second light distribution pattern P2 at a portion having a low light density in the second light distribution pattern P2, the light density near the second cutoff line CL2 becomes low in the second light distribution pattern P2.

As shown in FIG. 1, the third reflection surface 33 is positioned on the right side of the light source 2 and above the second reflection surface 32 in the reflector 3, and has a width in the up-and-down direction with respect to a diagonal line S3 that extends from the center of the light source 2. In other words, the third reflection surface 33 is in an area that is obliquely upward from the horizontal line HL-HR in the second reflection surface 32. The diagonal line S3 is a line that extends from the center of the light source 2 to a direction rotated clockwise by an angle (a center angle) $\theta_s$ with respect to the horizontal line HL-HR in the second reflection surface 32. As shown in FIG. 7, the angle $\theta_s$ coincides or substantially coincides with an angle made by a line extended from the second cutoff line CL2 (see, a chain double-dashed line in FIG. 7) and the slant third cutoff line CL3.

As shown in FIG. 1, the third reflection surface 33 includes vertically (longitudinally) divided three segments. The third reflection surface 33 mainly includes the slant third cutoff line CL3, and forms a third light distribution pattern between the first light distribution pattern P1 and the second light distribution pattern P2. Specifically, the third reflection surface 33 reflects a part of the light distribution pattern P10 shown in FIG. 2 to form the slant third cutoff line CL3 and a third light distribution pattern P3 including the slant third cutoff line CL3.

Although the borderlines between the segments of each of the first to third reflection surfaces 31 to 33 are shown in FIG. 1, there may be no borderline or a borderline cannot be recognized depending upon the segments.

As shown in FIG. 1, the fourth reflection surface 34 is provided in an area above the first reflection surface 31 and the third reflection surface 33. The fourth reflection surface 34 expands a part of the light distribution pattern P10 largely in the horizontal direction and a little in the vertical direction to form a light distribution pattern that does not include the first to third light distribution patterns P1 to P3, or a light distribution pattern that includes all of or a part of the first to third light distribution patterns P1 to P3.

The operation by the vehicle headlight 1 is explained. First, when a current is applied to the filament 21, a part of the light radiated from the filament 21 is shielded by the shade 22 (the shielding member). A remaining part of the light that is not shielded by the shade 22 is reflected by the first to fourth reflection surfaces 31 to 34, and is radiated forward of a vehicle as the predetermined light distribution pattern P as shown in FIG. 8.

As shown in FIGS. 5 to 8, the predetermined light distribution pattern P includes the first cutoff line CL1, the second cutoff line CL2, and the slant third cutoff line CL3. Specifically, as show in FIG. 8, the predetermined light distribution pattern P includes the first light distribution pattern P1 including the first cutoff line CL1, the second light distribution pattern P2 including the second cutoff line CL2, the third light distribution pattern P3 including the slant third cutoff line CL3, and other light distribution patterns.

The first light distribution pattern P1 including the first cutoff line CL1 is formed by the first reflection surface 31, and the light density near the first cutoff line CL1 is high. The second light distribution pattern P2 including the second cutoff line CL2 is formed by the second reflection surface 32, and the light density near the second cutoff line CL2 is low. The third light distribution pattern P3 including the slant third cutoff line CL3 is formed by the third reflection surface 33. Other light distribution patterns are formed by the fourth reflection surface 34.

According to the first embodiment, because the first edge 221 is projected to or near the horizontal line HL-HR, the first cutoff line CL1 is formed by the first edge 221 and the light density near the first cutoff line CL1 can be high in the first light distribution pattern P1. Thus, the vehicle headlight 1 can improve the visibility on the right driving lane 40 side.

Furthermore, according to the first embodiment, the light density near the second cutoff line CL2 is low in the second light distribution pattern P2. Thus, the vehicle headlight 1 does not cause glare on the left oncoming lane 41 side and discomfort due to the sharp light-dark border.

Moreover, according to the first embodiment, the third reflection surface 33 that is provided in an area obliquely upward from the horizontal line HL-HR in the second reflection surface 32 forms the third light distribution pattern P3 including the slant third cutoff line CL3 on or near the center line 42 between the first light distribution pattern P1 and the second light distribution pattern P2. An area A that is hatched with dotted lines in FIG. 7, i.e., the area A that includes the center line 42 and a portion near the center line 42, can be irradiated with the third light distribution pattern P3. As shown in FIG. 7, the area A covers a distant area on the right driving lane 40 side, but covers little of an area on the left oncoming lane 41 side. Thus, the vehicle headlight 1 can further improve the visibility on the right driving lane 40 side, and does not cause glare on the left oncoming lane 41 side. The chain double-dashed line in FIG. 7 represents an extension line of the second cutoff line CL2 and a diagonal cutoff line that connects the first cutoff line CL1 and the extension line of the second cutoff line CL2 when the third light distribution pattern P3 cannot be obtained by the third reflection surface 33.

Furthermore, according to the first embodiment, the vehicle headlight 1 can be achieved simply by providing the first to fourth reflection surfaces 31 to 34, and changing the attachment position of the light source, i.e., rotating the light source in the direction indicated by the arrow (counterclockwise) in FIG. 10, without necessitating any new component. Thus, the manufacturing cost can be reduced.

Figure 11:
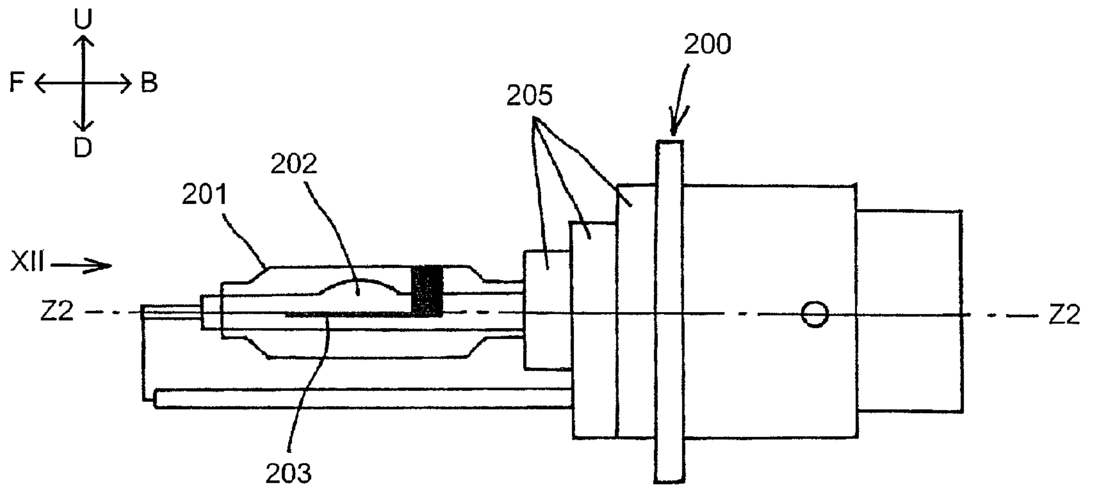
FIG. 11 is a side view of a discharge lamp as the light source.
Figure 12:
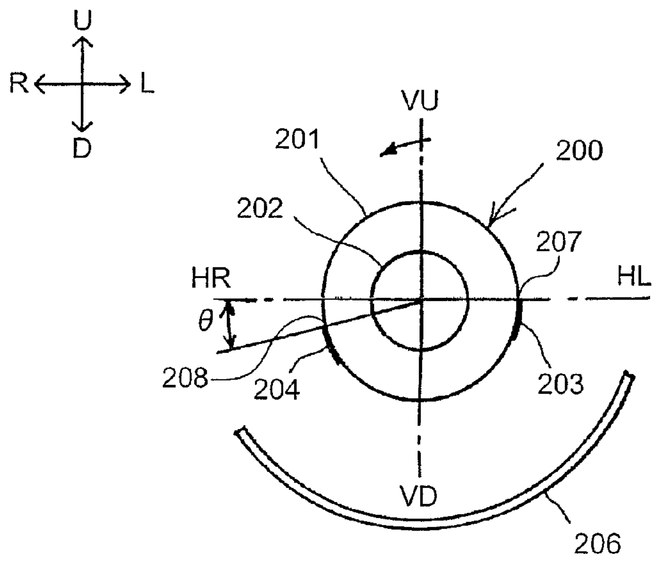
FIG. 12 is a schematic diagram of the discharge lamp seen from an arrow XII in FIG. 11.

FIGS. 11 and 12 are schematic diagrams for explaining an example in which a discharge lamp is used as a light source 200 instead of the halogen lamp.

The light source 200 is, for example, a gas-discharge light source. In the example, a high-pressure metal discharge lamp or a high-intensity discharge lamp (HID) such as a metal halide lamp is used as the light source 200. The light source 200 includes an outer tube (a glass tube) 201, a luminous tube (a light emitter) 202 arranged in the outer tube 201, light shielding films (shade stripes, black stripes) 203 and 204 as light shielding members arranged in the outer tube 201, and a base 205. In FIG. 12, a shade 206 is shown.

A noble gas (a xenon gas), a mercury, a metal iodide (sodium, scandium), or the like is filled in the luminous tube 202. An electrode on the base 205 side and an electrode on the side of a lead wire provided to the tip in the outer tube 201 through a ceramic pipe oppose each other with a slight clearance therebetween. When a voltage is applied between the electrodes, an arc discharge occurs in the luminous tube 202, so that the luminous tube 202 emits light. As shown in FIG. 12, the light shielding films 203 and 204 each having a predetermined width (a predetermined center angle) are provided to the outer tube 201. An angle between an upper first edge 207 of the light shielding film 203 on the left side (a border line on the clockwise side) and an upper second edge 208 of the light shielding film 204 on the right side (a border line on the counterclockwise side) is in a range of $(180+\theta)°$. The light source 200 is a D2R lamp or a D4R lamp provided with two light shielding stripes as a light shield coating in this example.

The light source 200 is attached to the reflector 3 in the same manner as the light source 2. That is, as shown in FIG. 12, the light source 200 is attached to the reflector 3 in a state in which the light source 200 is rotated in a direction indicated by an arrow (counterclockwise) around a lamp axis Z2-Z2 so that the upper first edge 207 is on or near a horizontal line HL-HR that passes the center of the luminous tube 202. Therefore, the upper first edge 207 is projected to or near the horizontal line HL-HR in the leftmost side first reflection surface 31 (see FIG. 1).

As shown in FIG. 12, the upper second edge 208 is at a position rotated counterclockwise by the angle θ with respect to the horizontal line HL-HR. Therefore, the upper second edge 208 is projected to a position rotated counterclockwise by the angle θ with respect to the horizontal line HL-HR in the rightmost side second reflection surface 32 (see FIG. 1).

The light source 200 is configured in such a manner, so that the light source 200 can obtain the same operational effects as the light source 2 that is a halogen lamp. That is, the vehicle headlight 1 can be achieved simply by providing the first to fourth reflection surfaces 31 to 34 and changing the attachment position of the light source without necessitating any new component. Thus, the manufacturing cost can be reduced.

Figure 13:
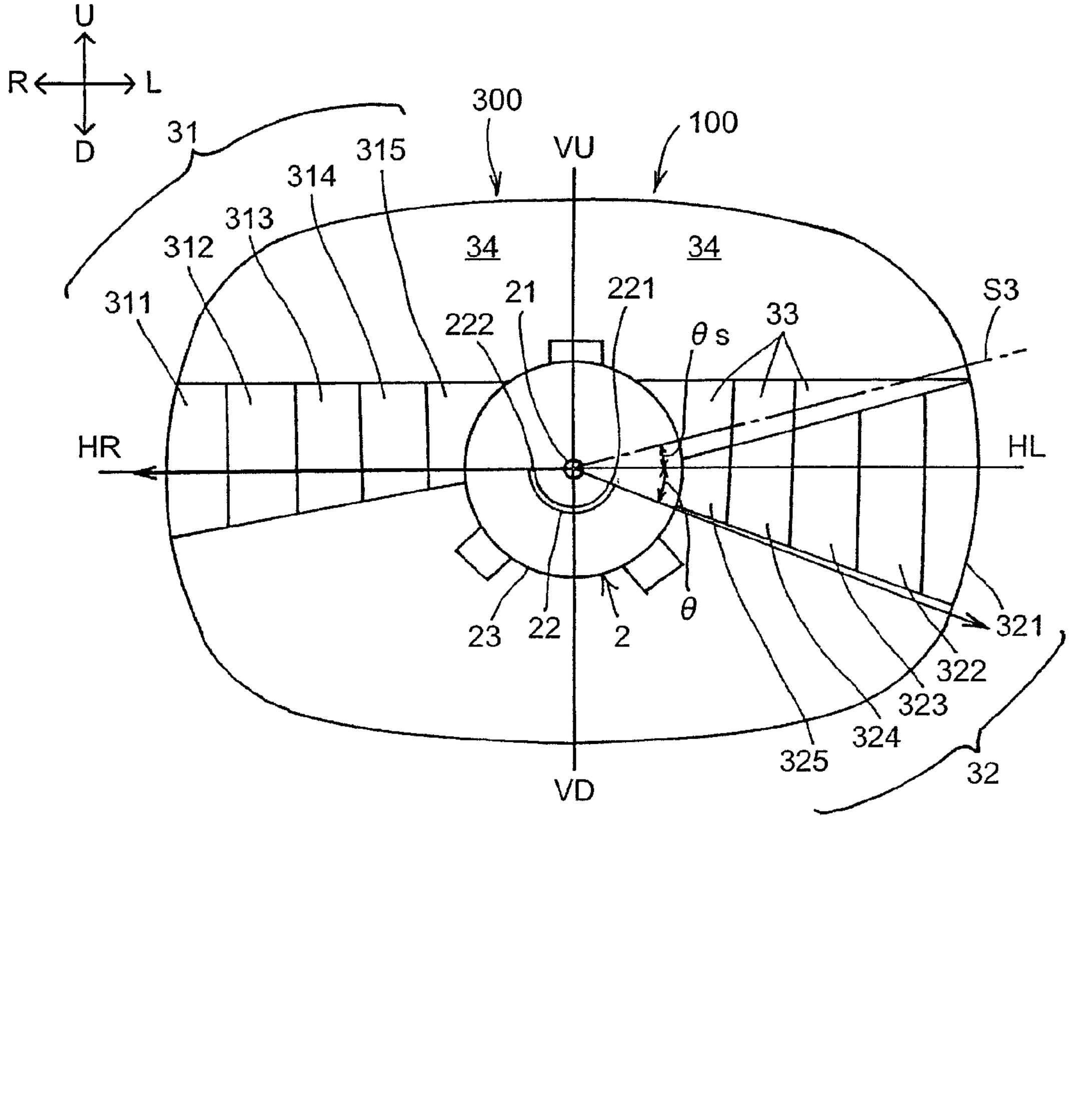
FIG. 13 is a front view of a light source and reflection surfaces of a reflector of a vehicle headlight according to a second embodiment of the present invention.
Figure 14:
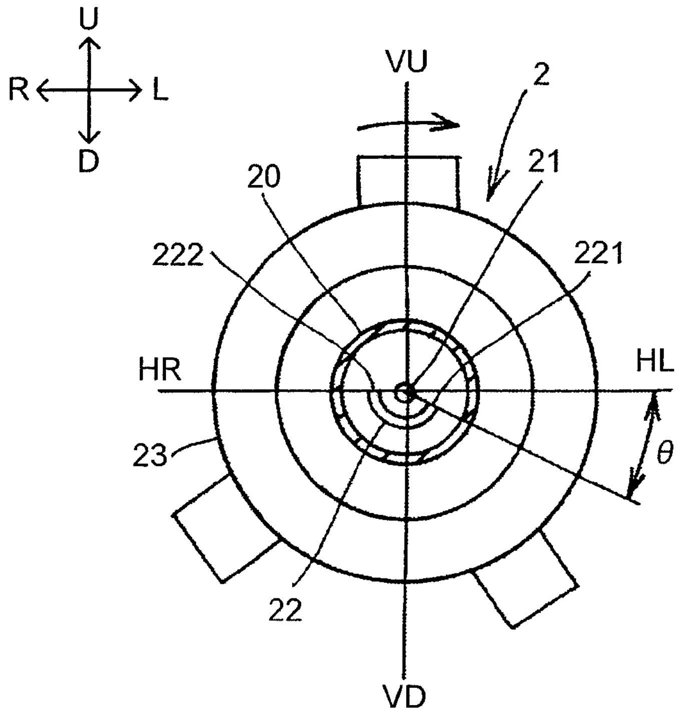
FIG. 14 is a cross section of a halogen lamp as the light source.
Figure 15:
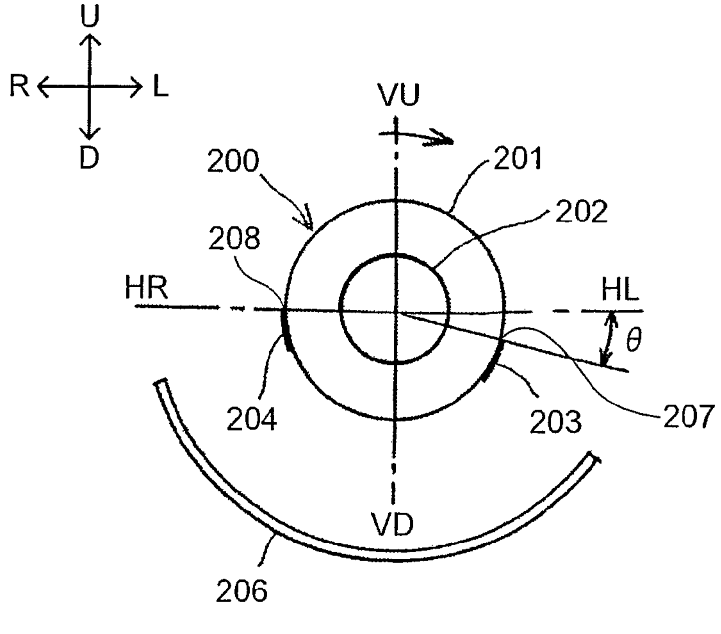
FIG. 15 is a front view of a discharge lamp as the light source.

FIGS. 13 to 15 are schematic diagrams of a vehicle headlight 100 according to a second embodiment of the present invention. In FIGS. 13 to 15, the components same as those in FIGS. 1 to 12 are given the same reference numerals. The vehicle headlight 100 is mounted on a vehicle that drives on the left side.

The vehicle headlight 100 includes a reflector 300 that has the first reflection surface 31, the second reflection surface 32, the third reflection surface 33, and the fourth reflection surface 34. The first to fourth reflection surfaces 31 to 34 are arranged in a mirror-inverted manner with respect to those of the vehicle headlight 1 in the first embodiment.

As shown in FIG. 14 (FIG. 15), the light source 2 (the light source 200) is attached to the reflector 300 in a state in which the light source 2 (the light source 200) is rotated in a direction indicated by an arrow (counterclockwise) around a lamp axis Z1-Z1 (a lamp axis Z2-Z2) so that the second edge 222 of the shade 22 (the upper second edge 208 of a second light shielding film 204) is on or near a horizontal line HL-HR that passes the center of the filament 21 (the luminous tube 202). Therefore, the second edge 222 (the upper second edge 208) is projected to or near the horizontal line HL-HR that passes the center of the light source 2 (the light source 200) in the rightmost side first reflection surface 31 (see FIG. 13). That is, the second edge 222 (the upper second edge 208) in the second embodiment works as the first edge 221 (the upper first edge 207) in the first embodiment.

As shown in FIG. 14 (FIG. 15), the first edge 221 of the shade 22 (the upper first edge 207 of a first light shielding film 203) is at a position rotated counterclockwise by an angle θ with respect to the horizontal line HL-HR that passes the filament 21 (the luminous tube 202). Therefore, the first edge 221 (the upper first edge 207) is projected to a position rotated counterclockwise by the angle θ with respect to the horizontal line HL-HR that passes the center of the light source 2 (the light source 200) in the leftmost side second reflection surface 32 (see FIG. 13). That is, the first edge 221 (the upper first edge 207) in the second embodiment works as the second edge 222 (the upper second edge 208) in the first embodiment.

The vehicle headlight 100 according to the second embodiment is configured in such a manner that the vehicle headlight 100 can obtain the same operational effects as the headlight 1 according to the first embodiment.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A vehicle headlight that irradiates a road ahead of a vehicle with a light distribution pattern including a first cutoff line substantially on a horizontal line of a screen on a driving lane side and a second cutoff line on an oncoming lane side, the vehicle headlight comprising:

a light source that radiates a light;

a light shielding member that shields a part of the light radiated from the light source and passes a remaining part of the light; and a reflection surface that reflects the light that passes the light shielding member ahead of the vehicle as the light distribution pattern, wherein the reflection surface includes a first reflection surface that forms a first light distribution pattern mainly including the first cutoff line on the driving lane side, and a second reflection surface that forms a second light distribution pattern mainly including the second cutoff line on the oncoming lane side, each of the first reflection surface and the second reflection surface has a width in an up-and-down direction with respect to a horizontal line that passes the light source, a shape of the light shielding member is projected substantially to the horizontal line that passes the light source in the first reflection surface to form the first cutoff line on the driving lane side, the light shielding member includes a first edge that increases a light density around the first cutoff line on the driving lane side in the first light distribution pattern, the light shielding member has a dish-like shape with a circular cross section to cover the lower side of the light source, and the second cut off line is formed to be lowered in light density only by the second reflection surface.

2. The vehicle headlight according to claim 1, wherein a slant third cutoff line substantially around a center line is formed between the first cutoff line on the driving lane side and the second cutoff line on the oncoming lane side in the light distribution pattern, the reflection surface further includes a third reflection surface that is formed in an area obliquely upward from the horizontal line that passes the light source in the second reflection surface, and the third reflection surface mainly includes the third cutoff line and forms a third light distribution pattern between the first light distribution pattern and the second light distribution pattern.

3. The vehicle headlight according to claim 1, wherein the light source is a halogen lamp including a tube, a filament arranged in the tube, and a shade as the light shielding member, and the light source is mounted in such a manner that the first edge of the shade is substantially on the horizontal line that passes the filament.

4. The vehicle headlight according to claim 1, wherein the light source is a discharge lamp including an outer tube, a luminous tube arranged in the outer tube, and a light shielding film as the light shielding member arranged in the outer tube, and the light source is mounted in such a manner that the first edge of the light shielding film is substantially on the horizontal line that passes the luminous tube.

5. The vehicle headlight according to claim 1, wherein a center angle of the light shielding member is configured to be (180-θ)°, with respect to the horizontal line, where the angle θ is about 15°.

* * * * *